United States Patent [19]

Matsumoto

[11] Patent Number: 4,702,972
[45] Date of Patent: Oct. 27, 1987

[54] ELECTROLYTE REPLENISHING SYSTEM FOR A LAMINATED FUEL CELL

[75] Inventor: Masaaki Matsumoto, Kobe, Japan

[73] Assignee: Mitsubishi Denki Kabushiki Kaisha, Tokyo, Japan

[21] Appl. No.: 932,096

[22] Filed: Nov. 18, 1986

[30] Foreign Application Priority Data

Nov. 20, 1985 [JP] Japan .................. 60-258639

[51] Int. Cl.[4] ................................. H01M 8/04
[52] U.S. Cl. ........................... 429/34; 429/25; 429/38; 429/72
[58] Field of Search .............. 429/34, 25, 38, 39, 429/14, 72, 51, 71

[56] References Cited

U.S. PATENT DOCUMENTS 4,463,067 7/1984 Feigenbaum .................. 429/34
4,467,019 8/1984 Feigenbaum .................. 429/34

Primary Examiner—Anthony Skapars
Attorney, Agent, or Firm—Leydig, Voit & Mayer

[57] ABSTRACT

An electrolyte replenishing system for a laminated type fuel cell supplies an electrolyte to each cell block through an electrolyte replenishing valve from a replenishing line connected to an electrolyte replenishing throat of the fuel cell. A overflowing machanism is provided to the electrolyte replenishing throat of each cell block, so that the electrolyte pressure does not exceed a predetermined head pressure in each of the cell block. The excess electrolyte is collected in a lower exhausted electrolyte tank through an electrolyte exhausting valve. The exhausted and overflowed electrolyte collected in the exhausted electrolyte tank is returned to the replenishing line by means of a pump.

16 Claims, 3 Drawing Figures

ELECTROLYTE REPLENISHING SYSTEM FOR A LAMINATED FUEL CELL

BACKGROUND OF THE INVENTION

This invention relates to an electrolyte replenishing system and more perticularly to an electrolyte replenishing system for a laminated type fuel cell for replenishing electrolyte such as a phosphoric acid into the fuel cell from its exterior.

FIG. 1 is a sectional view showing a prior-art laminated type fuel cell disclosed, for example, in Japanese Patent Application Laid-Open No. 58-165265. In FIG. 1, an electrolyte replenishing throat 1 for replenishing electrolyte into the fuel cell from its exterior is connected to a cooling plate 2. In order to distribute the electrolyte replenished by the electrolyte replenishing throat 1 to each cell in a stack, electrolyte conduits 3 are provided through respective reservoirs 5 which are formed on separator plates 4. Numeral 6 designates a porous nonconductive cell matrix. Electrodes are placed on both sides of the cell matrix 6, not shown in the figure. In the FIG. 1, the laminated type fuel cell comprises a plurality of cell blocks 7 which are stacked on each other, each cell block 7 being composed of five cells containing the cooling plate 2 as one unit.

According to the above constructions, the replenished electrolyte is supplied through the electrolyte replenishing throat 1 passes through the electrolyte conduit 3 and fills the respective reservoirs 5 of the five cells forming the cell block 7. Then, the electrolyte reaches the cell matrix 6 and is stored therein. When the cell matrix 6 is filled with the electrolyte, the fuel cell will be operable.

A problem arises in the prior-art electrolyte replenishing system for a laminated type fuel cell in that the electrolyte must be replenished for each cell block of the fuel cell and also for each time the electrolyte is used up. Further, to save time for supplying the electrolyte to each cell block, an electrolyte tank is connected directly to the electrolyte replenishing throat 1. However, this connection will result in excess head pressure to the lower cell block and in overflowing the electrolyte within the cell portion, which will prevent the fuel cell from operating normally.

Another problem arises in that since the cells in each cell block are electrically conductive with respect to each other through the electrolyte in the electrolyte conduit 3 after replenishing the electrolyte, a part of the output of the fuel cell will be lost as a leakage current and at the same time the separator plate 4 will be corroded.

A further problem arises in that when gases remain within the electrolyte conduit 3 or reservoir 5, the replenishment of the electrolyte will not be performed properly or it will become time-consuming.

SUMMARY OF THE INVENTION

Accordingly, an object of the present invention is to provide an electrolyte replenishing system for a laminated type fuel cell for replenishing the electrolyte continuously to each cell block of the laminated fuel cell with a constant head pressure so as to prevent a leakage of the electrolyte. Another object of the present invention is to provide an electrolyte replenishing system for preventing damage from occuring to the cells by exhausting the excess electrolyte after the replenishing step.

With the above object in view, the electrolyte replenishing system of the present invention supplies an electrolyte to each cell block through an electrolyte replenishing valve from a replenishing line connected to an electrolyte replenishing throat of a fuel cell. A overflowing machanism is provided to the electrolyte replenishing throat of each cell block, so that the electrolyte pressure does not exceed a predetermined head pressure in each of the cell block. The excess electrolyte is collected in a lower exhausted electrolyte tank through an electrolyte exhausting valve. The exhausted and overflowed electrolyte collected in the exhausted electrolyte tank is returned to the replenishing line by means of a pump.

BRIEF DESCRIPTION OF THE DRAWINGS

The present invention will become more readily apparent from the following detailed description of the preferred embodiment of the invention taken in conjunction with the accompanying drawings, in which:

FIG. 3 is a schematic sectional view of the cell block and electrolyte replenishing system shown in FIG. 2.

DESCRIPTION OF THE PREFERRED EMBODIMENT

Figure 1:
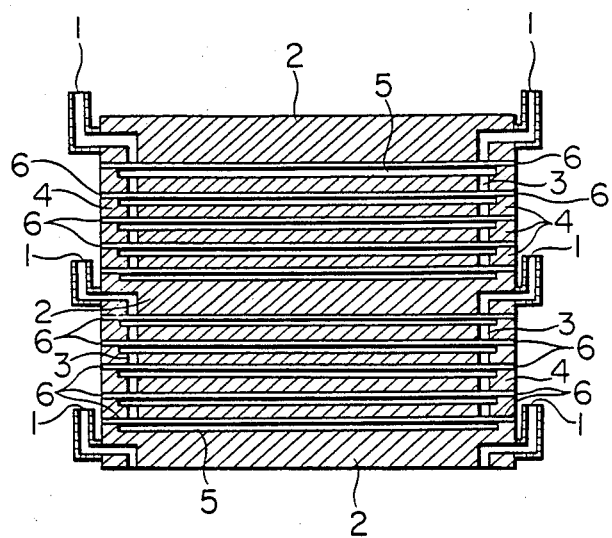
FIG. 1 is a front sectional view of a conventional laminated type fuel cell.
Figure 2:
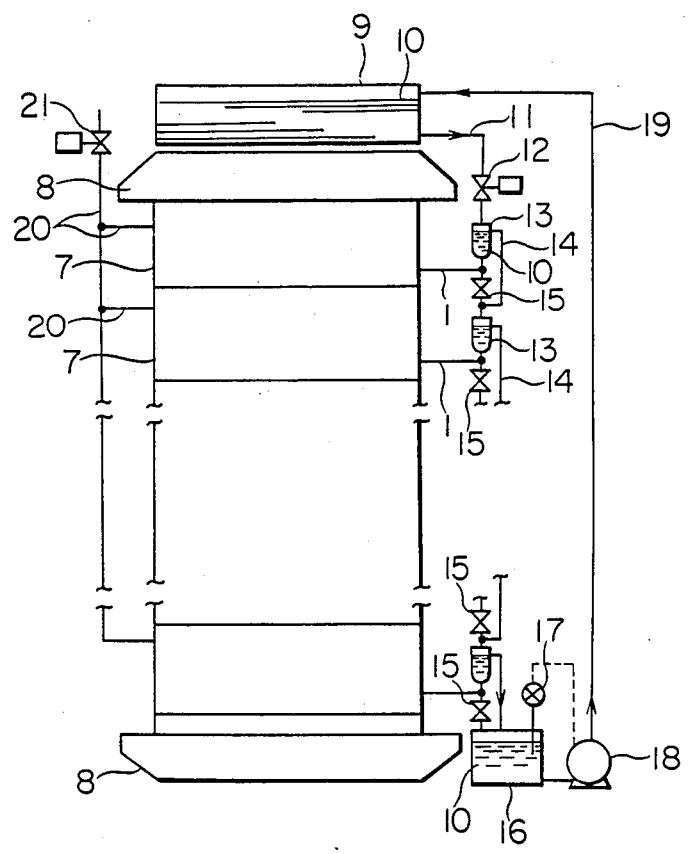
FIG. 2 is a schematic view of the laminated type fuel cell to which the electrolyte replenishing system is provided in accordance with the present invention.

FIGS. 2 and 3, in which one embodiment of the present invention is schematically illustrated, shows the laminated type fuel cell having an electrolyte replenishing system. In FIG. 2, a cell stack is pressed between a upper and a lower push plates 8. This cell stack is composed of a plurality of cell blocks 7, each of which consists of several cells as one unit containing a cooling plate 2, as shown in FIG. 3. An electrolyte replenishing tank 9 is disposed on the upper push plate 8 for storing the replenishing electrolyte. Numeral 10 designates the electrolyte. An electrolyte replenishing line 11 is connected to the electrolyte replenishing tank 9. An electrolyte replenishing valve 12 is provided on the upper stream side of the electrolyte replenishing line 11. A head pressure adjusting vessel 13 is provided on the inlet of the electrolyte replenishing throat 1 for each cell block. This head pressure adjusting vessel 13 regulates the head pressure of the replenishing electrolyte which is brought into the cell block 7. The inlet of the electrolyte replenishing throat 1 for replenishing the electrolyte into the cell block 7, is connected to the outlet of the head pressure adjusting vessel 13, and the outlet thereof is connected to the cell block 7. Overflow lines 14 are connected at one ends thereof to the head pressure adjusting vessel 13 and the other ends thereof to the inlet of the adjacent vessels 13, respectively. The position at which the respective one ends of the overflow lines 14 are connected to the vessel 13 is adjusted to be at the same height or above the top of each respective cell block 7. The overflow line 14 overflows the electrolyte so as to provide a predetermined head pressure in the head pressure adjusting vessel 13. The outlet of an electrolyte exhausting valve 15 is connected to the exhausted electrolyte tank 16, and the inlet thereof is connected to the inlet of the electrolyte replenishing throat 1 and to the outlet of the vessel 13. This electrolyte exhausting valve 15 exhausts the excess electrolyte after the electrolyte replenishment. The exhausted electrolyte tank 16 is utilized for storing the electrolyte returned from the electrolyte exhausting valve 15 and overflow line 14. A level switch 17 is disposed over the exhausted electrolyte tank 16, which detects the level, namely the height or volume, of the electrolyte 10 in the exhausted electrolyte tank 16. A pump 18 is connected to the exhausted electrolyte tank 16 for returning the stored electrolyte 10 to the electrolyte replenishing tank 9 through a returning line 19. On the other hand, a venting line 20 is connected to each cell block 7 at a side opposite to that of the electrolyte replenishing throat 1. The position of the venting line 20 is sufficiently higher than the connecting point of the overflow line 14 to the head pressure adjusting vessel 13. A venting valve 21 is provided on the top of the venting line 20. The other constituent elements are identical to those shown in FIG. 1.

When the electrolyte is replenished, the electrolyte replenishing valve 12 and venting valve 21 are opened, and the electrolyte exhausting valve 15 is closed. The electrolyte 10 is introduced into the head pressure adjusting vessel 13 through the electrolyte replenishing line 11 and electrolyte replenishing valve 12. The electrolyte passes through the electrolyte replenishing throat 1 and the electrolyte conduit 3 and then fills the reservoir 5 of the cells forming one cell block 7. During this time, gases in the reservoir 5 are exhausted through venting line 20 provided on the opposite side to the electrolyte replenishing throat 1. Accordingly, it is noted that the electrolyte 10 can be quickly and throughly introduced into the reservoir 5. Then, the electrolyte 10 in the reservoir 5 is penetrated into a cell matrix 6. During this operation, the electrolyte 10 is supplied successively into the head pressure adjusting vessel 13. When the level of the electrolyte in the head pressure adjusting vessel 13 reaches or goes above the top cell position in the cell block 7, the excess electrolyte will flow down to the next head pressure adjusting vessel 13 of the lower cell block 7 through the overflow line 14. By the repetition of this procedure, the electrolyte 10 is introduced and replenished into all cell blocks 7 in the cell stack. Since the head pressure of the electrolyte 10 is maintained below a predetermined value by means of the overflow line 14, the replenished electrolyte will not leak out to the exterior of any of the laminated type cells in the stack. The overflowed electrolyte 10 passing through the lowest overflow line 14 is supported in the exhausted electrolyte tank 16. The level of the electrolyte stored in the exhausted electrolyte tank 16 is maintained at a predetermined level by controlling the pump 18 according to the action of the level switch 17. Then, the electrolyte pumped out by the pump 18 is returned to the electrolyte replenishing tank 9 through the returning line 19.

After the above electrolyte replenishment procedure, by shutting the electrolyte replenishing valve 12 and at the same time opening the electrolyte exhausting valves 15, the excess electrolyte 10, which will induce a liquid junction within the each cell block, is returned to the electrolyte replenishing tank 9 through the exhausted electrolyte tank 16, pump 18, and returning line 19. After drawing out the excess electrolyte, the venting valve 21 and electrolyte exhausting valve 15 are shut to complete the replenishment of the electrolyte.

In the above described electrolyte replenishment, by opening any one of the electrolyte exhausting valves 15, the respective cell block 7 which is unnecessary for replenishment, is not replenished with the electrolyte, while replenishment of the electrolyte to the other cell block 7 can be performed. Accordingly, selective replenishment of the cell block 7 can be performed.

In the above embodiment of the present invention, both manually and automatically operated valves are usable for the electrolyte replenishing valve 12, electrolyte exhausting valve 15, and venting valve 21. When using the automatic valve, it is possible to replenish the electrolyte automatically to the fuel cell, which is usually contained in a pressure vessel, thereby saving time for opening the pressure vessel and making the replenishing operation easier.

The electrolyte replenishing tank 9, which is provided on the lamanated type fuel cell in the above embodiment, can be omitted. In this case, by connecting the electrolyte returning line 19 directly with the replenishing line 11, the same effect as the above embodiment can be obtained.

Further, it is possible to form the portions which come into contact with the electrolyte, such as the electrolyte tank, replenishing line, valve, head pressure adjusting vessel, pump etc., using polytetrafluoroethylene or glass, thereby improving the durability thereof.

As is clearly indicated, the present invention is constructed so as to be able to overflow and exhaust the excess electrolyte for each cell block and also to circulate the electrolyte. Accordingly, the electrolyte can be successively replenished to all cell blocks or selected cell blocks with a constant head pressure. Also, the output loss owing to the liquid junction and the damage to the separator plate can be prevented by exhausting of the excess electrolyte. Moreover, by providing the venting line, the replenishment of the electrolyte can be accomplished quickly and reliably.

What is claimed is:

1. An electrolyte replenishing system for a laminated type fuel cell comprising:
 a cell block having a plurality of cells;
 an electrolyte replenishing throat for supplying an electrolyte to said cell block, the outlet of which is connected to said cell block;
 an electrolyte exhausting valve for exhausting the excess electrolyte, the inlet of which is connected to the inlet of said electrolyte replenishing throat;
 a head pressure adjusting vessel for regulating the head pressure of the replenishing electrolyte which is brought into said cell block, the outlet of which is connected to the inlet of said electrolyte exhausting valve and to the inlet of said replenishing throat;
 an electrolyte replenishing valve the output side of which is connected to the input of said head pressure adjusting vessel;
 an overflow line for providing a predetermined head pressure in said head pressure adjusting vessel, one end of which is connected to said head pressure adjusting vessel and the other end of which is connected to the output of said electrolyte exhausting valve;
 an exhausted electrolyte tank for storing the electrolyte exhausted from said electrolyte exhausting valve and overflow line, to which the outlet of said electrolyte exhausting valve and the other end of said overflow line are connected;
 a pump for returning the electrolyte stored in said exhausted electrolyte tank to the inlet of said electrolyte replenishing valve, the input of which is connected to the outlet of said exhausted electrolyte tank, and the output of which is connected to the input side of said electrolyte replenishing valve; and a venting line for exhausting gas in a reservoir in the cell block, which is connected to said cell block at the opposite side to said electrolyte replenishing throat.

2. An electrolyte replenishing system for a laminated type fuel cell as claimed in claim 1, further comprising;
an electrolyte replenishing tank for storing the replenishing electrolyte provided on the top of the cell block, the inlet of which is connected to the output of said pump;
a replenishing line, the inlet of which is connected to said electrolyte replenishing tank and the outlet of which is connected to the input side of said electrolyte replenishing valve.

3. An electrolyte replenishing system for a laminated type fuel cell as claimed in claim 1, wherein the one end of said overflow line is connected to said head adjusting vessel at the same level as the top of the cell block.

4. An electrolyte replenishing system for a laminated type fuel cell as claimed in claim 1, wherein the one end of said overflow line is connected to said head pressure adjusting vessel at a level higher than the level of the top of the cell block.

5. An electrolyte replenishing system for a laminated type fuel cell as claimed in claim 1, wherein the portions which come into contact with the electrolyte are formed of polytetrafluoroethylene.

6. An electrolyte replenishing system for a laminated type fuel cell as claimed in claim 2, wherein the portions which come into contact with the electrolyte are formed of polytetrafluoroethylene.

7. An electrolyte, replenishing system for a laminated type fuel cell as claimed in claim 1, wherein portions which come into contact with the electrolyte are formed of glass.

8. An electrolyte replenishing system for a laminated type fuel cell as claimed 2, wherein portions which come into contact with the electrolyte are formed of glass.

9. An electrolyte replenishing system for a laminated type fuel cell as claimed in claim 1, wherein said fuel cell comprises a plurality of cell blocks stacked on each other to form a cell stack, each of the cell blocks being composed of a plurality of cells and having associated therewith an electrolyte exhausting valve and an overflow line.

10. An electrolyte replenishing system for a laminated type fuel cell as claimed in claim 9, wherein the outlet of said electrolyte exhausting valve and the other end of the overflow line of each cell block are connected to the inlet of the head pressure adjusting vessel of the respective lower adjacent cell block.

11. An electrolyte replenishing system for a laminated type fuel cell as claimed in claim 9, further comprising:
an electrolyte replenishing tank for storing the replenishing electrolyte provided on the top of the cell block, the inlet of which is connected to the output of said pump;
a replenishing line, the inlet of which is connected to said electrolyte replenishing tank and the outlet of which is connected to the input side of said electroyte replenishing valve.

12. An electrolyte replenishing system for a laminated type fuel cell as claimed in claim 11, wherein said one end of each of the overflow lines is connected to said head adjusting vessel at the same level as the top of the reflective block.

13. An electrolyte replenishing system for a laminated type fuel cell as claimed in claim 11, wherein said one end of each of said overflow lines is connected to said head pressure adjusting vessel at a level higher than the top of the respective cell block.

14. An electrolyte replenishing system for a laminated type fuel cell as claimed in claim 11, wherein the portions which come into contact with the electrolyte are formed of polytetrafluoroethylene.

15. An electrolyte replenishing system for a laminated type fuel cell as claimed in claim 11, wherein portions which come into contact with the electrolyte are formed of glass.

16. An electrolyte replenishing system for a laminated type fuel cell which comprises:
a plurality of cell blocks stacked on each other, each cell block comprising a cell block having a plurality of cells, an electrolyte replenishing throat for supplying an electrolyte to said cell block, the outlet of which is connected to said cell block, an electrolyte exhausting valve for exhausting the excess electrolyte, the inlet of which is connected to the inlet of said electrolyte replenishing throat, a head pressure adjusting vessel for regulating the head pressure of the replenishing electrolyte which is brought into said cell block, the outlet of which is connected to the inlet of said electrolyte exhausting valve and to the inlet of said replenishing throat, and an overflow line for providing a predetermined head pressure in said head pressure adjusting vessel, one end of which is connected to said head pressure adjusting vessel and the other end of which is connected to the output of said electrolyte exhausting valve;
an electrolyte replenishing tank for storing the replenishing electrolyte provided on the top of the stack of cell blocks;
an exhausted electrolyte tank for storing the electrolyte exhausted from said stack of cell blocks, the input of which is connected to the outlet of said electrolyte exhausting valve and the outlet of said overflow line of the lower most cell block in said stack of cell blocks;
a pump for returning the electrolyte stored in said exhausted electrolyte tank to said electrolyte replenishing tank, the input of which is connected to the outlet of said exhausted electrolyte tank, and the output of which is connected to the inlet of said electrolyte replenishing tank;
an electrolyte replenishing valve the input side of which is connected to the outlet of said electrolyte replenishing tank and the output side of which is connected to the inlet of the head pressure adjusting vessel of the upper most cell block in said stack of cell blocks; and
a venting line for exhausting gas in reservoirs in each of the cell blocks, said venting line being connected to each cell block in said stack of cell blocks at the opposite side with respect to said electrolyte replenishing throat,
the outlet of each of said electrolyte exhausting valve being connected to the inlet of the head pressure adjusting vessel of the respective lower adjacent cell block.

* * * * *